United States Patent
Fang et al.

(10) Patent No.: US 8,726,155 B2
(45) Date of Patent: May 13, 2014

(54) SYSTEM OF INDIVIDUALLY AND SEPARATELY DISPLAYING AND SHARING VIDEO/AUDIO AND METHOD OF THE SAME

(75) Inventors: De Min Fang, Jhonghe (TW); Chin Ming Yang, Jhonghe (TW)

(73) Assignee: Funtoro Inc., Taipei County (TW)

( * ) Notice: Subject to any disclaimer, the term of this patent is extended or adjusted under 35 U.S.C. 154(b) by 1350 days.

(21) Appl. No.: 12/076,035

(22) Filed: Mar. 13, 2008

(65) Prior Publication Data

US 2008/0229202 A1  Sep. 18, 2008

(30) Foreign Application Priority Data

Mar. 14, 2007 (TW) .............................. 096108731 A

(51) Int. Cl.
*G06F 3/00* (2006.01)
(52) U.S. Cl.
USPC .......................................................... 715/716
(58) Field of Classification Search
CPC .......... H04N 7/17318; H04N 21/2223; H04N 21/41407; H04N 21/47202; G06F 17/30038; G06F 3/14; G06F 3/04842; G06F 3/0488
USPC .......................................................... 715/716
See application file for complete search history.

(56) References Cited

U.S. PATENT DOCUMENTS 4,759,717 A * 7/1988 Larochelle et al. ........... 434/118
5,555,466 A * 9/1996 Scribner et al. ................. 725/75
2002/0059616 A1 * 5/2002 Vasilevsky et al. ............. 725/78
2005/0278754 A1 * 12/2005 Bleacher et al. ................ 725/77
2006/0020950 A1 * 1/2006 Ladd et al. ..................... 719/328
2006/0020960 A1 * 1/2006 Relan et al. ...................... 725/30
2006/0190968 A1 * 8/2006 Jung et al. ........................ 725/74
2008/0147248 A1 * 6/2008 Kawamura ........................ 701/1
2008/0229202 A1 * 9/2008 Fang et al. ..................... 715/716

* cited by examiner

*Primary Examiner* — Amy Ng
*Assistant Examiner* — Andres E Gutierrez
(74) *Attorney, Agent, or Firm* — Guice Patents PLLC

(57) ABSTRACT

The present invention relates to a system of individually and separately displaying and sharing of video/audio that is used in an vehicle, comprises: a primary video/audio device having a micro processor, a storing device for storing various of digital video/audio information owned by a user for displaying in secondary video/audio devices and a network interface, the primary video/audio device provides at least one service of displaying digital video/audio information; and a plurality of secondary video/audio devices, each of the secondary video/audio devices is provided with a digital video/audio encoding device, a network interface, a display panel or a video/audio output interface and an operation interface, and the operation interface is provided with a display key and a share key; each of the secondary video/audio devices can individually and at-any-time applies a service request to the primary video/audio device and obtains a related service, such as video/audio displaying, or one of the secondary video/audio devices can invite the other secondary video/audio devices to share what is displayed on the display panel by pressing the share key. A method of sharing vehicle navigating maps is also disclosed by the present invention.

18 Claims, 10 Drawing Sheets

SYSTEM OF INDIVIDUALLY AND SEPARATELY DISPLAYING AND SHARING VIDEO/AUDIO AND METHOD OF THE SAME

BACKGROUND OF THE INVENTION

1. Field of the Invention

The present invention relates to a system of individually and separately displaying and sharing video/audio and method of the same, more particularly to a system of individually and separately displaying and sharing video/audio and method of the same used in an vehicle, wherein each secondary video/audio device can individually and at-anytime applies a service request to a primary video/audio device and obtains a related service, such as video/audio displaying, or the secondary video/audio device can invite the other secondary video/audio devices to share what is displayed on the display panel by pressing a share key.

2. Description of Related Art

Referring to FIG. 1, which is a schematic connecting diagram of a conventional video/audio displaying system used in a vehicle; as shown in FIG. 1, the conventional video/audio displaying system used in a vehicle, e.g. a DVD or a DTV (digital television), includes a primary device 80 and a plurality of display panels 90, the display panels 90 are respectively connected to the primary device 80 via connecting cables 95 for receiving video/audio signals transferred by the primary device 80, e.g. NTSC or PAL, then displaying. But the above mentioned display panels 90 of the conventional video/audio displaying system can not individually display different contents, e.g. a user A and a user B have to watch the same video/audio signal source such as DVD or digital radio; this is because the primary device 80 only decodes a single video/audio signal source, the user A and the user B can not watch different video/audio signal sources.

SUMMARY OF THE INVENTION

For resolving the disadvantages of the above mentioned art, one object of the present invention is to provide a system of individually and separately displaying and sharing video/audio and method of the same, wherein a wired or a wireless network interface is used to transfer digital video/audio files to each displaying device for individually decoding, so users of each of the displaying devices can watch desired video/audio files or share the media content that is currently watching with other users.

Another object of the present invention is to provide a method of sharing vehicle navigating maps, so a driver can share the navigating information with other users, or the other users can plan the navigating information according to the needs of the driver then share the result with the driver, driving safety is therefore increased.

Another object of the present invention is to provide a method of recording the status of video/audio system before shutting down, which can record the status of the secondary video/audio device while shutting down, so when restarting, the secondary video/audio device can display the recovered images.

For achieving the described objects, the system of individually and separately displaying video/audio provided by the present invention comprises the steps of: providing a primary video/audio device having a micro processor, a storing device for storing various of digital video/audio information owned by the user for displaying in secondary video/audio devices, and a network interface connected to the secondary video/audio devices and the primary video/audio device provides at least one service of video/audio displaying; providing a plurality of the secondary video/audio devices, each of the secondary video/audio devices is provide with a digital video/audio decoding device, a network interface, a display panel or a video/audio output interface and an operation interface, and the operation interface is provided with a display key; when a user of one of the secondary video/audio devices presses the display key, the primary video/audio device transfers the digital video/audio information to the secondary video/audio device according to the instruction of the user, and the video/audio information is displayed after being decoded by the digital video/audio decoding device, so different users can display their own video/audio information with the above mentioned method and the display content can be the same or different from other users, so object of individually and separately displaying video/audio information on the primary video/audio device is achieved.

For achieving the described objects, the present invention provides a method of sharing video/audio displaying information, which can let a user share his video/audio information, e.g. a video, a music, an image, that is currently watching with other users, comprises the steps of: providing a primary video/audio device having a micro processor, a storing device and a network interface and the primary video/audio device provides at least one service of video/audio displaying, e.g. a video, a music or an image; providing a plurality of secondary video/audio devices, each of the secondary video/audio devices is provided with a digital video/audio decoding device, a network interface, a display panel or a video/audio output interface and an operation interface, e.g. a remote control, a touch screen device, or a key, and the operation interface is provided with a share key; when the share key is pressed by a user, the displaying content on the secondary video/audio device operated by the user can be synchronizely shared with the other secondary video/audio devices; a "share" or a similar prompt is respectively shown on the display panels of the other secondary video/audio devices; if the users of the other secondary video/audio devices reject the "share" prompt, the "share" prompt will disappear after a certain time; if the users of the other secondary video/audio devices accept the "share" prompt, the users can press the share key, the video/audio information provided by the user who offers the "share" is then transferred to the secondary video/audio devices in which the "share" prompt is accepted by the primary video/audio device, the display panels of the secondary video/audio devices display the same content as what's displayed on the display panel of the user who offers the "share" prompt.

For achieving the described objects, the present invention provides a method of sharing vehicle navigating maps, comprises the steps of: providing a primary video/audio device having a micro processor, a storing device and a network interface, the primary video/audio device provides at least one service of navigating maps; a plurality of secondary video/audio devices, each of the secondary video/audio devices is provided with a digital video/audio decoding device, a network interface, a display panel or a video/audio output interface and an operation interface, the operation interface is provided with a share key; the share key is pressed by a driver for sharing the navigating maps; a "share" or a similar prompt is respectively shown on the display panels of the other secondary video/audio devices; if the users of the other secondary video/audio devices reject the "share" prompt, the "share" prompt will disappear after a certain time; if the users of the other secondary video/audio devices accept the "share" prompt, the users can press the share key, the navigating maps and information currently being used by the driver is then transferred to the secondary video/audio devices by the primary video/audio device, the display panels of the secondary video/audio devices display the same navigating maps as what is shown on the display panel of the driver. In other words, other passengers can search and plan the navigating route then press the share key for providing the navigating maps to the driver, then the driver can press the share key for accepting the planed navigating maps, so assistance of route navigating is provided and the risk of planning the driving route while driving is reduced.

For achieving the described objects, the present invention provides a method of recording the status of video/audio system before shutting down, comprises the steps of: providing a primary video/audio device having a micro processor, a storing device and a network interface, the primary video/audio device provides at least one service of displaying video/audio information; a plurality of secondary video/audio devices, each of the secondary video/audio devices is provided with a digital video/audio decoding device, a network interface, a display panel or a video/audio output interface and an operation interface, the operation interface is provided with a display key; the display key is pressed by a user, then a request is sent to the primary video/audio device for the service of displaying video/audio information; the primary video/audio device starts the service of displaying video/audio information and a service monitoring is activated, the displaying status of the secondary video/audio devices are continuously recorded and stored in the storing device; when one of the secondary video/audio devices is shut down and restarted later on, a request from the secondary video/audio device is automatically sent to the primary video/audio device for continuing the service of displaying video/audio information from the time point at which the secondary video/audio device is shut down, the service monitoring record of the secondary video/audio device is requested by the primary video/audio device then the service of displaying video/audio information at the time point at which the secondary video/audio device is shut down is continually provided according to the service monitoring record.

DETAILED DESCRIPTION OF THE PREFERRED EMBODIMENT

Figure 1:
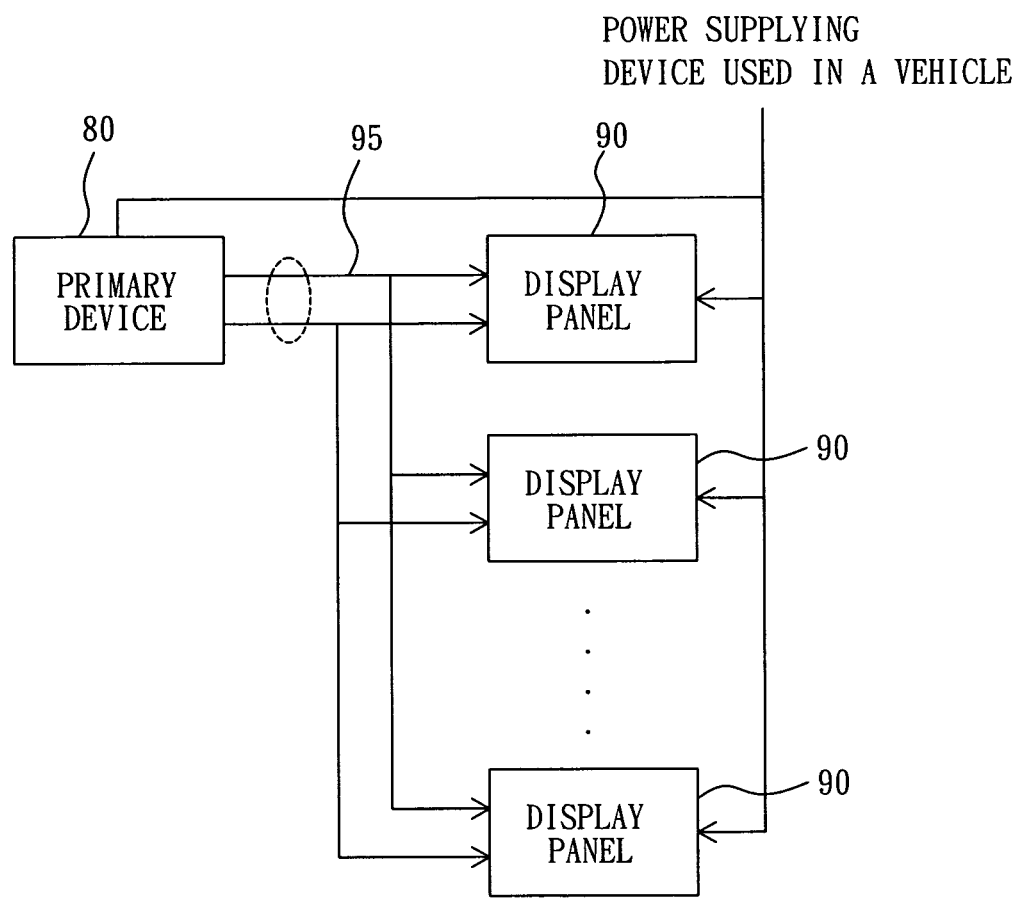
FIG. 1 is a schematic connecting diagram of a conventional video/audio displaying system used in a vehicle.
Figure 2:
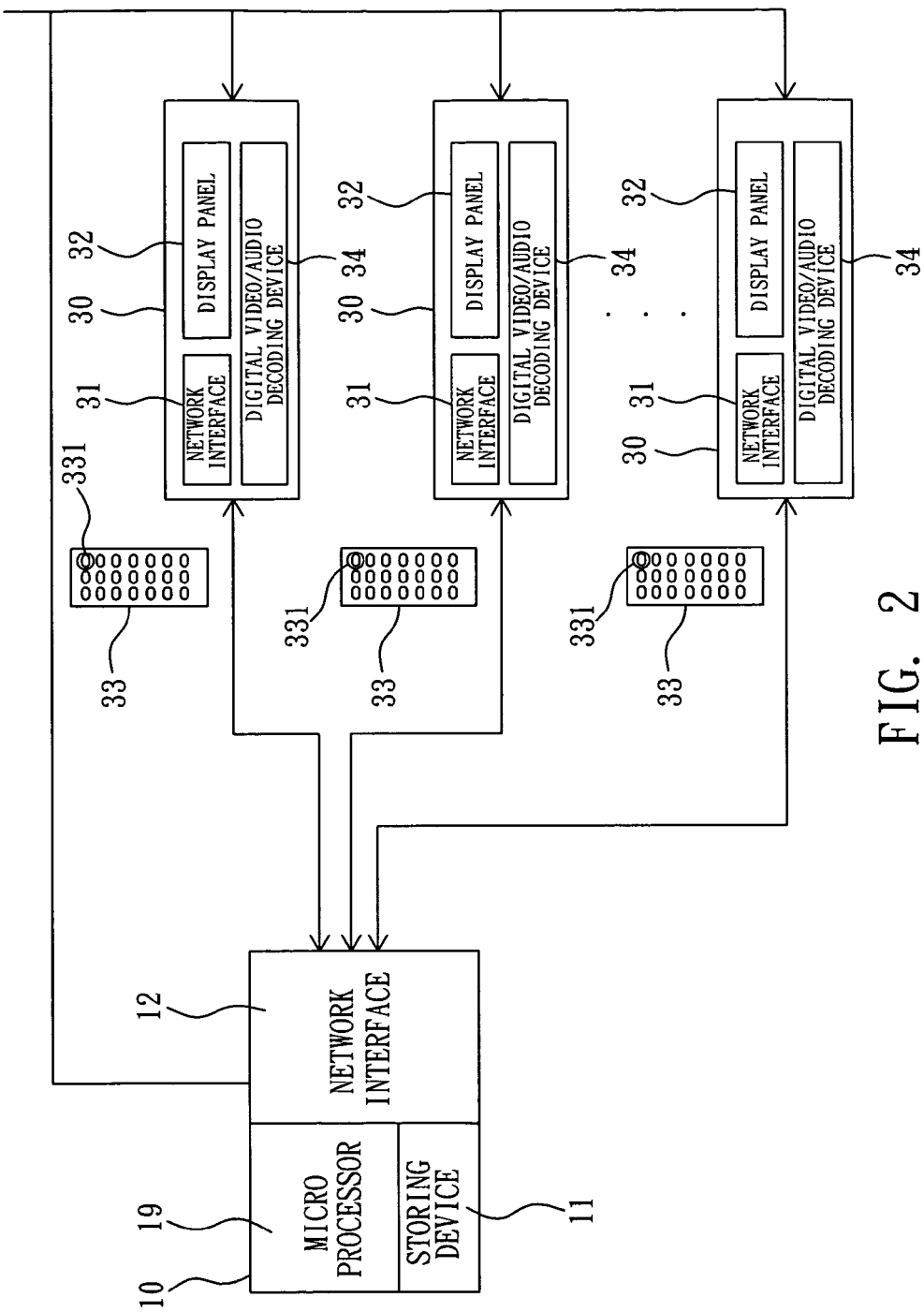
FIG. 2 is schematic block diagram of the system of individually and separately displaying and sharing provided by the present invention.
Figure 3:
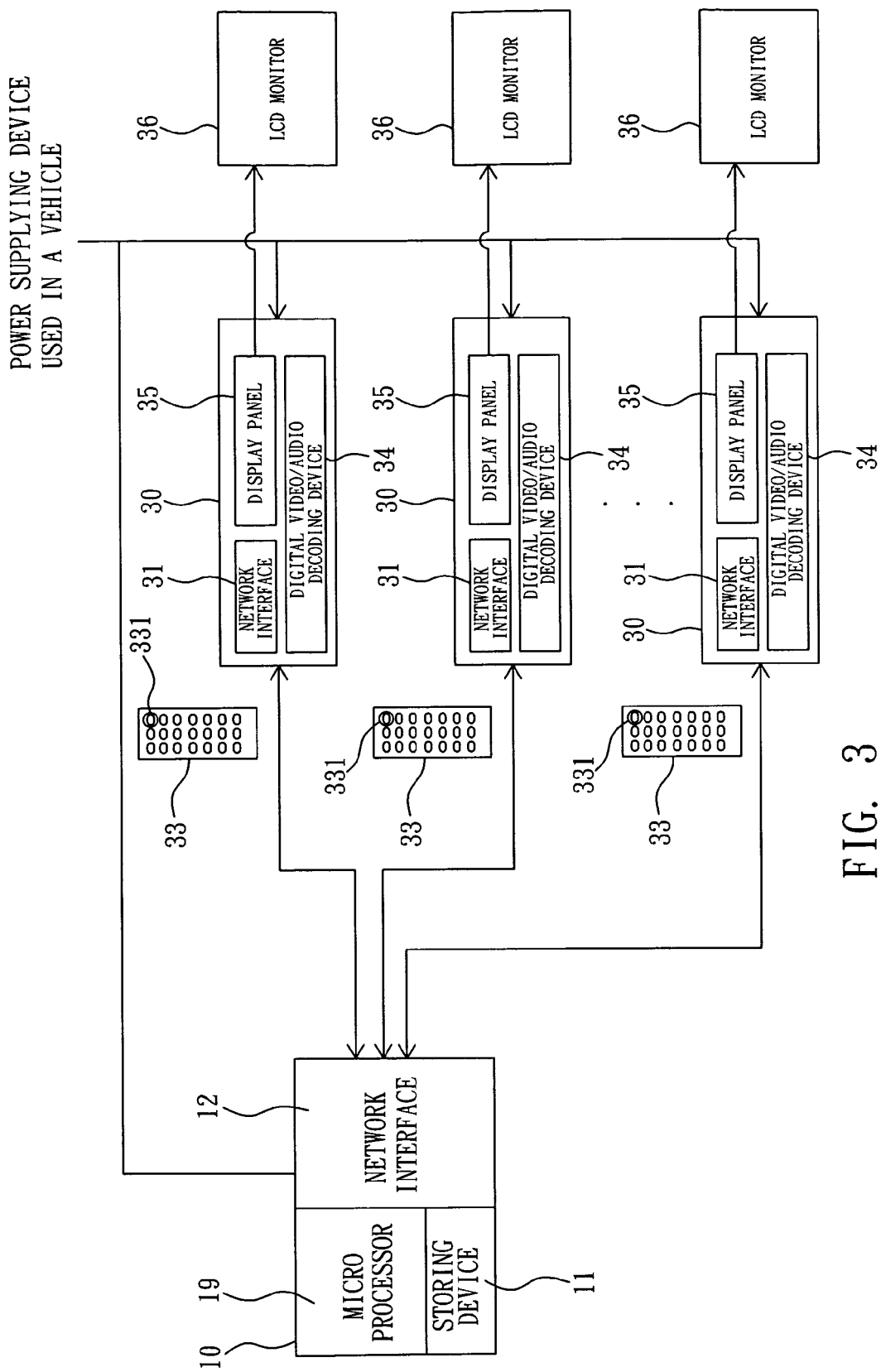
FIG. 3 is another schematic block diagram of the system of individually and separately displaying and sharing provided by another embodiment of the present invention.
Figure 4:
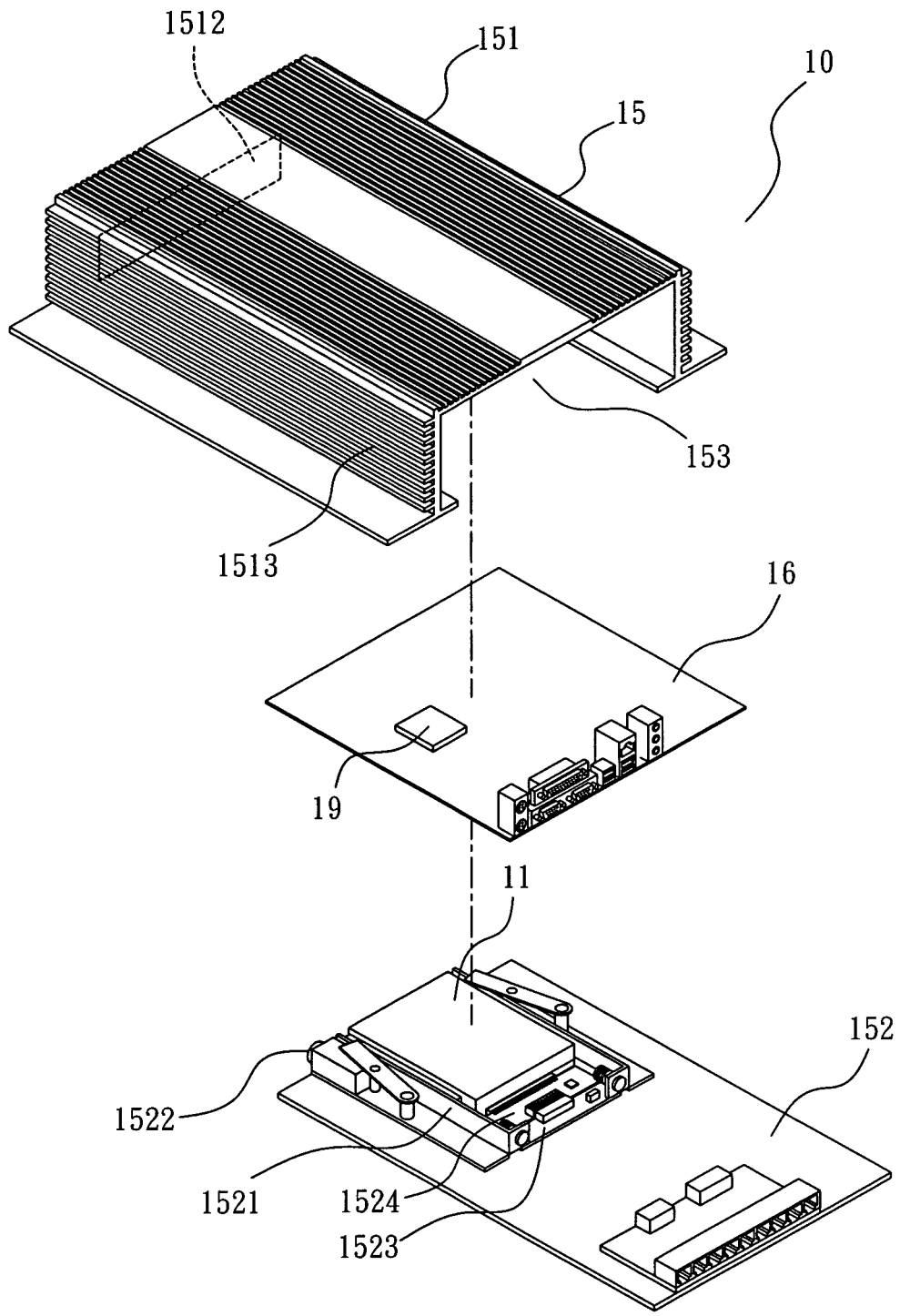
FIG. 4 is a schematic view of the assembly of the primary video/audio device provided by the present invention.
Figure 5:
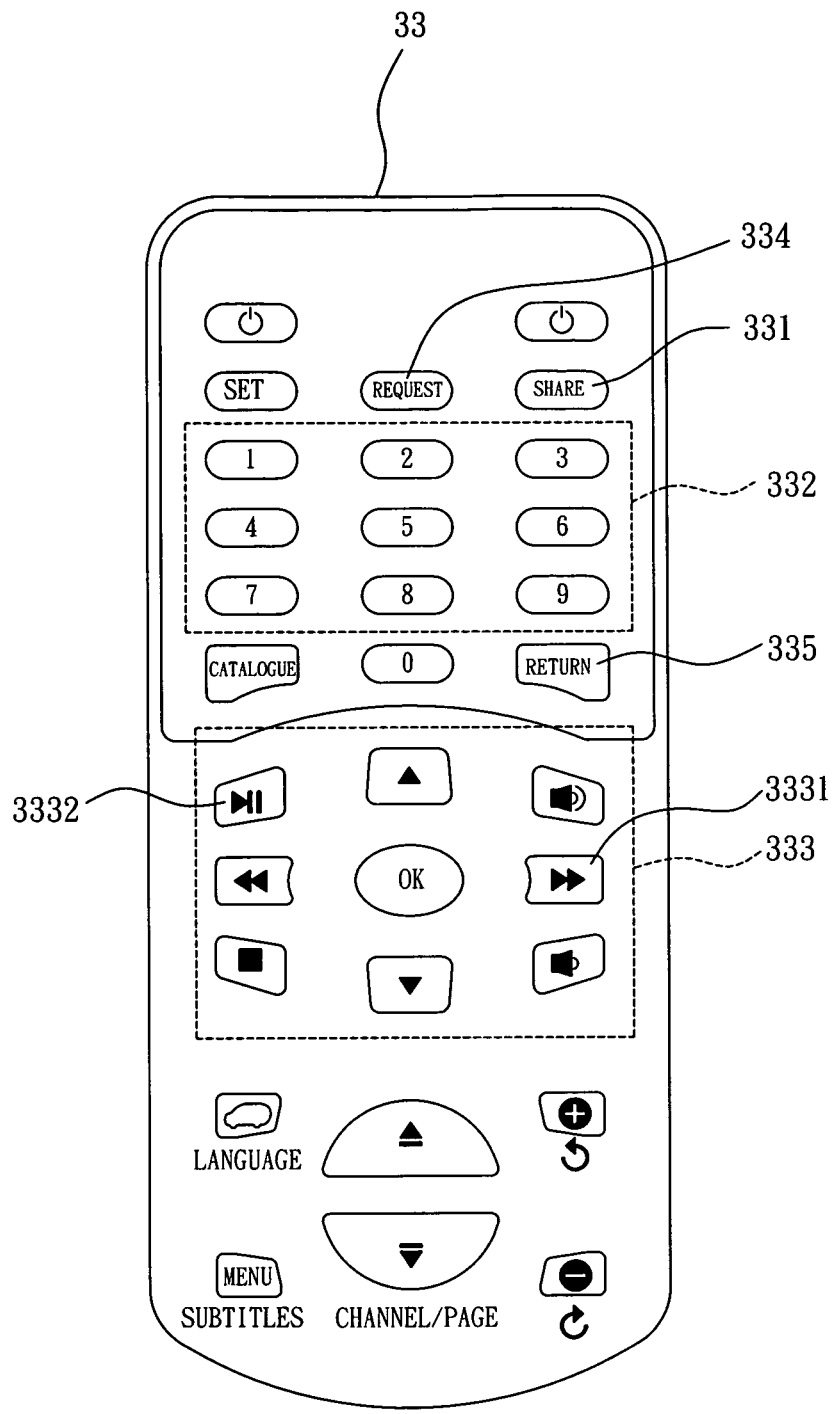
FIG. 5 is schematic view of the operation interface provided by the present invention.

Referring to the FIG. 2 to FIG. 5, wherein FIG. 2 is schematic block diagram of the system of individually and separately displaying and sharing provided by the present invention; FIG. 3 is another schematic block diagram of the system of individually and separately displaying and sharing provided by another embodiment of the present invention, FIG. 4 is a schematic view of the assembly of the primary video/audio device provided by the present invention; FIG. 5 is schematic view of the operation interface provided by the present invention. As shown in FIG. 2, the system of individually and separately displaying and sharing provided by the present invention is utilized in a vehicle, which includes: a primary video/audio device 10 and a plurality of secondary video/audio devices 30.

The primary video/audio device 10 is provided with a micro processor 19, a storing device 11 and a network interface 12, the primary video/audio device 10 provides at least one service of displaying video/audio information, in this embodiment the displaying services provided by the primary video/audio device 10 include: a music displaying service, a radio displaying service, a navigating service, a digital TV displaying service, a video displaying service and an image displaying service. The network interface 12 can be a wired or a wireless network; when the network interface 12 is a wireless network, the network interface 12 can be a Bluetooth, an 802.11x, a WLAN, a WiMax, a Zigbee or a similar art; when the network interface 12 is a wired network, the network interface 12 can be a RJ-11, a RJ-45/PoE, a Power Line (HomePlug AV), a USB cable, a 1394 cable, a MOST, an IDB-1394 or a similar art.

Each of the secondary video/audio devices 30 is provide with a digital video/audio decoding device 34, a network interface 31, a display panel 32 (referring to FIG. 2) or a video/audio output interface 35 (referring to FIG. 3) and an operation interface 33, wherein the video/audio output interface 35 can be, but not limited to, an AV terminal, a S terminal, a HDMI terminal, a VGA terminal, a RGB terminal or a similar interface that can be connected to an external LCD monitor 36; the operation interface 33 can be, but not limited to, a remote control, a touch screen device or a key, in this embodiment a remote control is used for illustration though not limited to such remote control device, the operation interface 33 is provided with at least a share key 331 and a display key 3332; the digital video/audio decoding device 34 is a high speed micro processor using software to decode digital video/audio or a micro processor having a decoding chip equipped with a certain video/audio decoding circuit.

Each of the secondary video/audio devices 30 is connected to the primary video/audio device 10 via the network interface 31; wherein the network interface 31 can be a wired or wireless network; when the network interface 31 is a wireless network, the network interface 31 can be a Bluetooth, a 802.11x, a WLAN, a WiMax, a Zigbee or a similar art; when the network interface 31 is a wired network, the network interface 31 can be a RJ-11, a RJ-45/PoE, a Power Line (HomePlug AV), an USB cable, a 1394 cable, a MOST, an IDB-1394 or a similar art. And the network interface 12 of the primary video/audio device 10 and the network interfaces 31 of the secondary video/audio devices 30 have the same network protocol, in this embodiment a RJ-45/PoE is used for illustration but not limited to such device of RJ-45/PoE. The display panel 32 is a LCD or a flat monitor that can be provided at the central controlling display or a rear end of a seat for convenience in viewing. Each of the secondary video/audio devices 30 can a device equipped with a digital video/audio decoding device 34, a network interface 31, a video/audio output interface 35 connected to an external LCD monitor 36 and an operation interface 33.

As shown in FIG. 4, the primary video/audio device 10 of the present invention is further provided with a storing device 11, a housing 15, a printed circuit board 16 and a micro processor 19.

The housing 15 has a top housing member 151 and a bottom housing member 152 and an accommodating space 153 is formed between the top housing member 151 and the bottom housing member 152, the front end of the top housing member 151 has an opening 1512, the housing 15 is made of materials having higher thermal conduction capacity, e.g. but not limited to, be made of punched aluminum, two ends of the top housing member 151 are respectively provided with a heat sinking fin 1513 for facilitating the heat sinking of the housing 15. The bottom end of the bottom housing member 152 is further provided with an insert slot 1521, a withdraw button 1522 and a connecting sheet 1523, wherein the insert slot 1521 and the withdraw button 1522 are exposed outside of the opening 1512, the insert slot 1521 is served to receive the storing device 11, the withdraw button 1522 is served to withdraw the storing device 11, the connecting sheet 1523 is disposed at the rear end of the insert slot 1521 and is retained on the bottom housing member 152, a connecting device 1524 is provided on top of the connecting sheet 1523 for connecting to the storing device 11.

The printed circuit board 16 is provided inside the accommodating space 153 for carrying the micro processor 19.

The storing device 11 is inserted into the accommodating space 153 via the opening 1512 for storing at least one digital video/audio file; wherein the format of the digital video/audio file is JPEG, MPEG, H.264, WMV, MP3, WMA, map information or other formats.

The micro processor 19 is disposed on the printed circuit board 16 and is coupled with the storing device 11 for controlling the operation of the primary video/audio device 10.

As shown in FIG. 5, the operation interface 33 provided by the present invention is provided with at least one share key 331 for providing or receiving share, a plurality of numeral keys 332 and video/audio operating keys 333, e.g. a direction key 3331 and a display key 3332. The share key 331 is served to let a user to activate the mechanism of sharing digital contents provided by the present invention. When the share key 331 is pressed, a "share" or a similar prompt is respectively shown on the display panels 32 or 36 of the other secondary video/audio devices 30, the other users of the other secondary video/audio devices 30 can press the share key 331 within a certain time, e.g. 5 seconds, for accepting the share of the display service; if the time exceeds the determined value, e.g. 5 seconds, and the share key 331 is not pressed yet, the "share" or the similar prompt will disappear, the contents shown on the display panels 32 or 36 will be remained.

Figure 6:
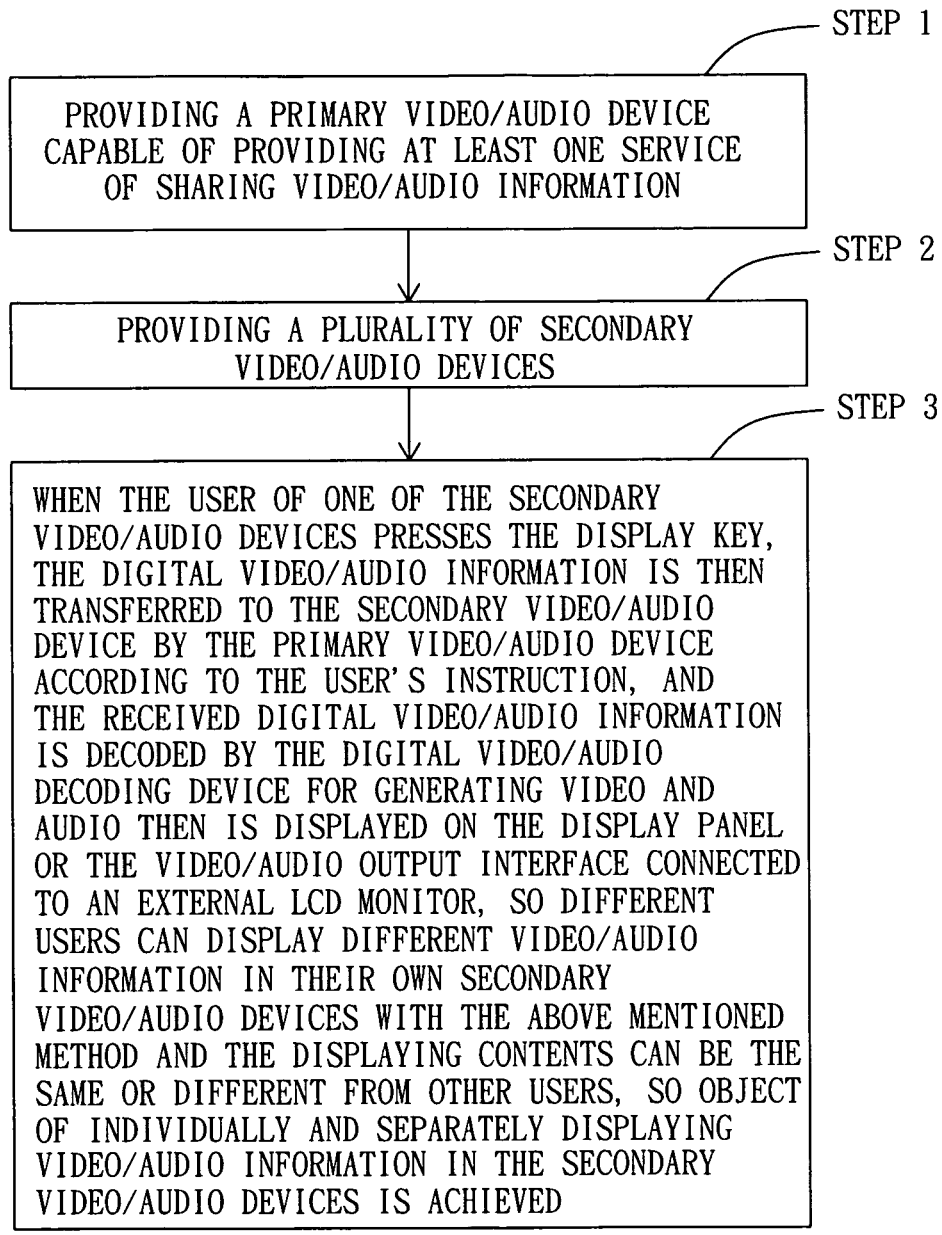
FIG. 6 is a schematic flowchart of the method of individually and separately displaying video/audio information in a vehicle provided by the present invention.
Figure 7:
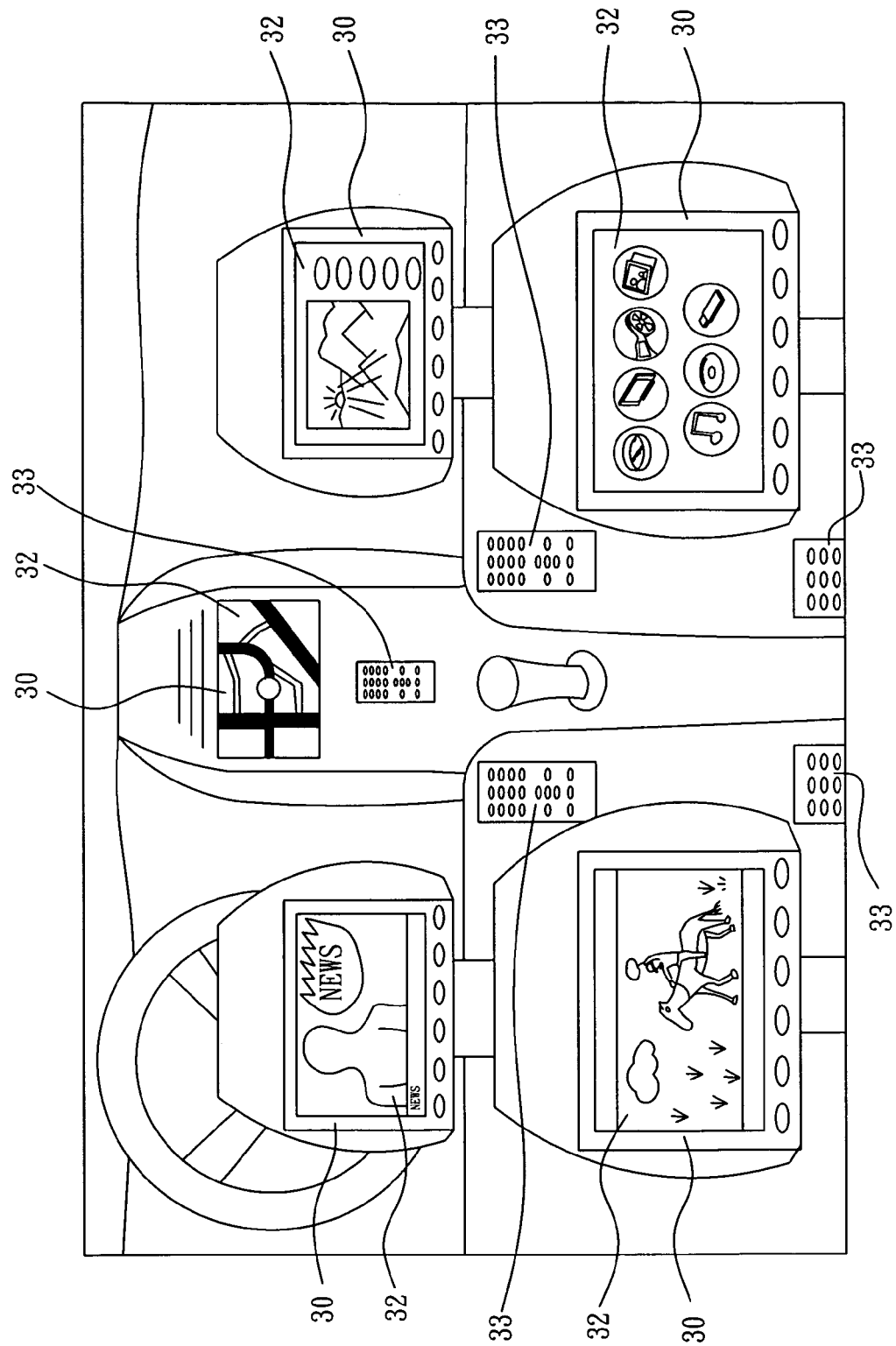
FIG. 7 is a schematic view of the substantiation of the individually and separately displaying and sharing of video/audio according to the present invention.

Referring to FIG. 6 and FIG. 7, wherein FIG. 6 is a schematic flowchart of the method of individually and separately displaying video/audio information in a vehicle provided by the present invention; FIG. 7 is a schematic view of the substantiation of the individually and separately displaying and sharing of video/audio according to the present invention.

As shown in FIG. 6, the method of individually and separately displaying video/audio information in a vehicle provided by the present invention comprises the steps of: providing a primary video/audio device 10 that can provide at least one service of sharing video/audio information (step 1); providing a plurality of secondary video/audio devices 30 (step 2); when the user of one of the secondary video/audio devices 30 presses the display key 3332, the digital video/audio information is then transferred to the secondary video/audio device 30 by the primary video/audio device 10 according to the user's instruction, and the received digital video/audio information is decoded by the digital video/audio decoding device 34 for generating video and audio then is displayed on the display panel 32 or the video/audio output interface 35 connected to an external LCD monitor 36, so different users can display different video/audio information in their own secondary video/audio devices 30 with the above mentioned method and the displaying contents can be the same or different from other users, so object of individually and separately displaying video/audio information in the secondary video/audio devices 30 is achieved (step 3).

In the step 1, a primary video/audio device 10 is provided, and the primary video/audio device 10 is further provided with a micro processor 19, a storing device 11 and a network interface 12, the primary video/audio device 10 can provide at least one service of sharing video/audio information; wherein the network interface 12 can be a wired or a wireless network; when the network interface 12 is a wireless network, the network interface 12 can be a Bluetooth, an 802.11x, a WLAN, a WiMax, a Zigbee or a similar art; when the network interface 12 is a wired network, the network interface 12 can be a RJ-11, a RJ-45/PoE, a Power Line (HomePlug AV), a USB cable, a 1394 cable, a MOST, an IDB-1394 or a similar art and the video/audio information can be a video information, an image information, a music information, a digital TV information or a radio information. The primary video/audio device 10 is further provided with a housing 15, a printed circuit board 16, a storing device 11 and a micro processor 19, as described above.

In the step 2, a plurality of secondary video/audio devices 30 are provided, each of the secondary video/audio devices 30 is provided with a digital video/audio decoding device 34, a network interface 31, a display panel 32 or a video/audio output interface 35 connected to an external LCD monitor 36 and an operation interface 33 provided with a display key 3332; wherein the network interface 31 can be a wired or wireless network that has the same network protocol as the network interface 12; the display panel 32 or the video/audio output interface 35 connected to the external LCD monitor 36 can be, but not limited to, a LCD or a flat monitor that can be installed at the central controlling display or a rear end of a seat of a vehicle for the convenience in viewing; the operation interface 33 can be a remote control, a touch screen device or a key, in this embodiment a remote control is used for illustration but not limited to such device, the display key 3332 is served to let a user to activate the mechanism of individually and separately displaying video/audio in an vehicle provided by the present invention.

Figure 8:
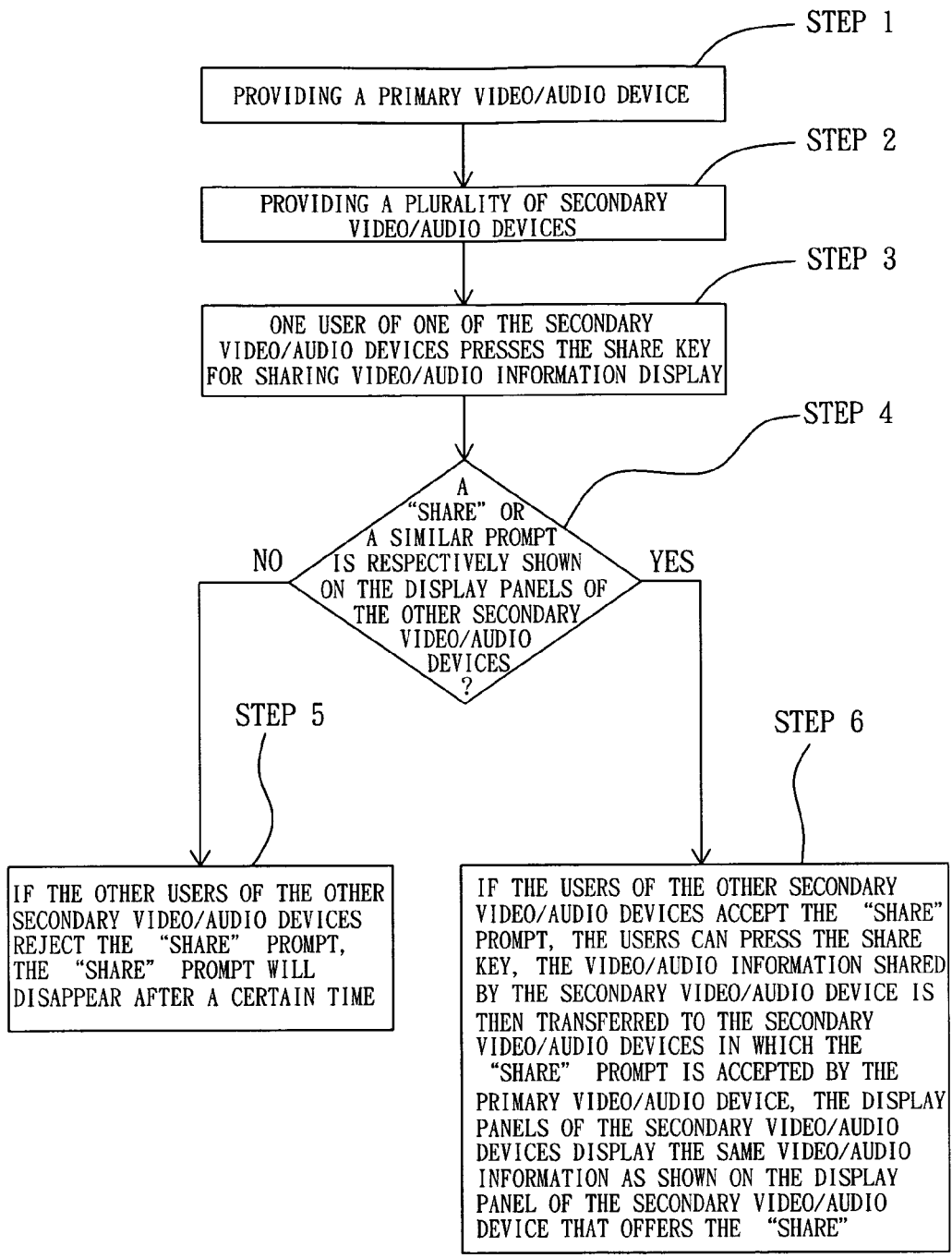
FIG. 8 is a schematic flowchart of the method of sharing video/audio information display in a vehicle provided by the present invention.

As shown in FIG. 8, the method of sharing video/audio information display provided by the present invention which can be used to share the media content that is currently watching, e.g. a video, a music, an image, a radio, a digital TV, with other users, comprises the steps of: providing a primary video/audio device 10 (step 1); providing a plurality of secondary video/audio devices 30 (step 2); a user A presses the share key 331 (step 3); a "share" or a similar prompt is respectively shown on the display panels 32 or the external displaying devices 36 of the other secondary video/audio devices 30 (step 4); if the other users of the other secondary video/audio devices 30 reject the "share" prompt, the "share"

prompt will disappear after a certain time (step 5); if the other users of the other secondary video/audio devices 30 accept the "share" prompt, the share key 331 will be pressed, the video/audio information provided by the user A who offers the "share" is then transferred to the secondary video/audio devices 30 in which the "share" prompt is accepted by the primary video/audio device 10, the display panels 32 or the external displaying devices 36 of the secondary video/audio devices 30 display the same content, e.g. a video, a music, an image, a radio, a digital TV, as displayed on the display panel 32 of the user A who offers the "share" prompt (step 6).

In the step 1, a primary video/audio device 10 is provided, and the primary video/audio device 10 is further provided with a micro processor 19, a storing device 11 and a network interface 12, the primary video/audio device 10 can provide at least one service of sharing video/audio information, e.g. a music, an image, a radio, a digital TV; wherein the network interface 12 can be a wired or a wireless network; when the network interface 12 is a wireless network, the network interface 12 can be a Bluetooth, an 802.11x, a WLAN, a WiMax, a Zigbee or a similar art; when the network interface 12 is a wired network, the network interface 12 can be a RJ-11, a RJ-45/PoE, a Power Line (HomePlug AV), a USB cable, a 1394 cable, a MOST, a IDB-1394 or a similar art and the video/audio information can be a video information, an image information, a music information, a digital TV information or a radio information. The primary video/audio device 10 is further provided with a housing 15, a printed circuit board 16, a storing device 11 and a micro processor 19, as described above.

In the step 2, a plurality of secondary video/audio devices 30 are provided, each of the secondary video/audio devices 30 is provided with a digital video/audio decoding device 34, a network interface 31, a display panel 32 or a video/audio output interface 35 connected to an external LCD monitor 36 and an operation interface 33 provided with a share key 331; wherein the network interface 31 can be a wired or wireless network that has the same network protocol as the network interface 12; the display panel 32 or the video/audio output interface 35 connected to the external LCD monitor 36 can be, but not limited to, a LCD or a flat monitor that can be installed at the central controlling display or a rear end of a seat of a vehicle for the convenience in viewing; the operation interface 33 can be a remote control, a touch screen device or a key, in this embodiment a remote control is used for illustration but not limited to such device, the share key 331 is served to let a user to activate the sharing mechanism, e.g. displaying a music, an image, a radio, a digital TV.

In the step 3, the share key 331 is pressed by the user A to activate the sharing mechanism provided by the present invention, so the other users can synchronizely watch the same video/audio display, e.g. a music, an image, a radio, a digital TV, as what is currently watched by the user A.

In the step 4, a "share" or a similar prompt is respectively shown on the display panels 32 or the external displaying devices 36 of the other secondary video/audio devices 30 for prompting the other users whether they want to accept the sharing and display the same content.

In the step 5, if the other users of the other users of the other secondary video/audio devices 30 reject the "share" prompt, the "share" prompt will disappear after a certain time, wherein the certain time can be, but not limited to, 5 seconds.

In the step 6, if the other users of the other secondary video/audio devices 30 accept the "share" prompt, the "share" key 331 will be pressed, the video/audio information displayed by the user A, e.g. a video, a music, an image, a radio, a digital TV, is then transferred to the secondary video/audio devices 30 in which the "share" prompt is accepted by the primary video/audio device 10, the display panels 32 or the external displaying devices 36 of the secondary video/audio devices 30 display the same content as what is displayed on the display panel 32 or the external displaying device 36 of the user A.

Figure 9:
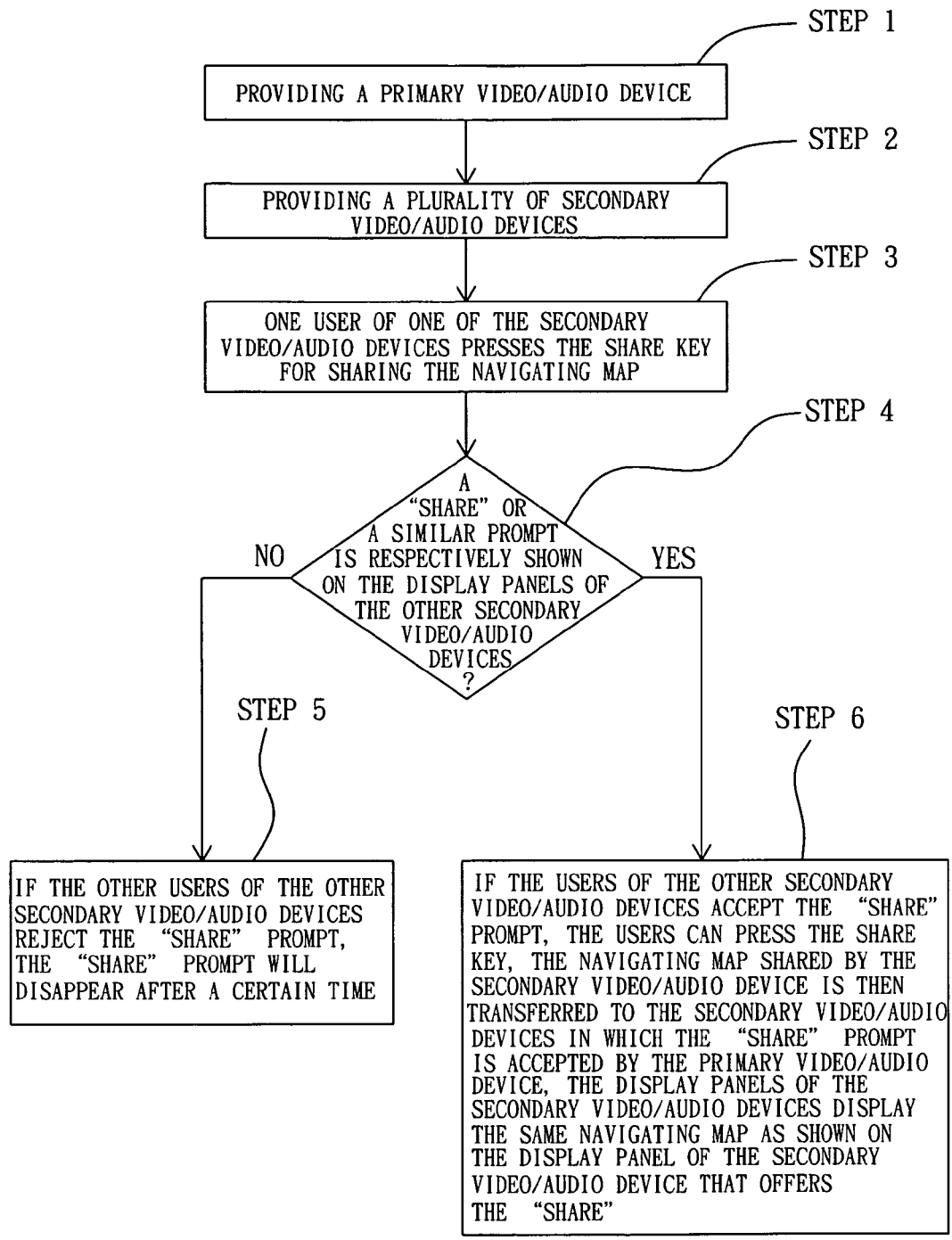
FIG. 9 is a schematic flowchart of the method of sharing vehicle navigating information provided by the present invention.

As shown in FIG. 9, the method of sharing navigating maps and information provided by the present invention, comprises the steps of: providing a primary video/audio device 10 (step 1); providing a plurality of secondary video/audio devices 30 (step 2); a user A presses the share key 331 (step 3); a "share" or a similar prompt is respectively shown on the display panels 32 or the external displaying devices 36 of the other secondary video/audio devices 30 (step 4); if the other users of the other secondary video/audio devices 30 reject the "share" prompt, the "share" prompt will disappear after a certain time (step 5); if the other users of the other secondary video/audio devices 30 accept the "share" prompt, the share key 331 will be pressed, the navigating maps and information currently used by the user A who offers the share is then transferred to the secondary video/audio devices 30 in which the "share" prompt is accepted by the primary video/audio device 10, the display panels 32 or the external displaying devices 36 of the secondary video/audio devices 30 display the same content as displayed on the display panel 32 of the user A (step 6).

In the step 1, a primary video/audio device 10 is provided, and the primary video/audio device 10 is further provided with a micro processor 19, a storing device 11 and a network interface 12, the primary video/audio device 10 can provide at least one sharing service, e.g. sharing route navigating; wherein the network interface 12 can be a wired or a wireless network; when the network interface 12 is a wireless network, the network interface 12 can be a Bluetooth, an 802.11x, a WLAN, a WiMax, a Zigbee or a similar art; when the network interface 12 is a wired network, the network interface 12 can be a RJ-11, a RJ-45/PoE, a Power Line (HomePlug AV), a USB cable, a 1394 cable, a MOST, a IDB-1394 or a similar art. The primary video/audio device 10 is further provided with a housing 15, a printed circuit board 16, a storing device 11 and a micro processor 19, as described above.

In the step 2, a plurality of secondary video/audio devices 30 are provided, each of the secondary video/audio devices 30 is provided with a digital video/audio decoding device 34, a network interface 31, a display panel 32 or a video/audio output interface 35 connected to an external LCD monitor 36 and an operation interface 33 provided with a share key 331; wherein the network interface 31 can be a wired or wireless network that has the same network protocol as the network interface 12; the display panel 32 or the video/audio output interface 35 connected to the external LCD monitor 36 can be, but not limited to, a LCD or a flat monitor that can be installed at the central controlling display or a rear end of a seat of a vehicle for the convenience in viewing; the operation interface 33 can be a remote control, a touch screen device or a key, in this embodiment a remote control is used for illustration but not limited to such device, the share key 331 is served to let a user to activate the sharing of navigating maps and information provided by the present invention.

In the step 3, when the user A is using the navigating maps, the share key 331 is pressed by the user A to activate the sharing mechanism provided by the present invention, so the other users can synchronizely watch and use the same navigating maps and information.

In the step 4, a "share" or a similar prompt is respectively shown on the display panels 32 or the external displaying devices 36 of the other secondary video/audio devices 30 for prompting the other users whether they want to accept the sharing and display the same content.

In the step 5, if the other users of the other secondary video/audio devices 30 reject the "share" prompt, the "share" prompt will disappear after a certain time, wherein the certain time can be, but not limited to, 5 seconds.

In the step 6, if the other users of the other secondary video/audio devices 30 accept the "share" prompt, the "share" key 331 will be pressed, the navigating maps and information that is currently displayed by the user A in the step 3 is then synchronizely transferred to the user A and the other users who accept the "share" prompt, the display panels 32, 36 of the other users display the same content as what is displayed on the display panel 32, 36 of the user A.

With the method of sharing vehicle navigating maps provided by the present invention, the user A can be a driver of a vehicle and share the navigating information with other users; on the other hand, the user A can be a passenger who plan the navigating route then share the result with the driver to assist the driver navigating, so the driver does not have to drive and plan or search the route at the same, the driving safety is therefore increased.

Figure 10:
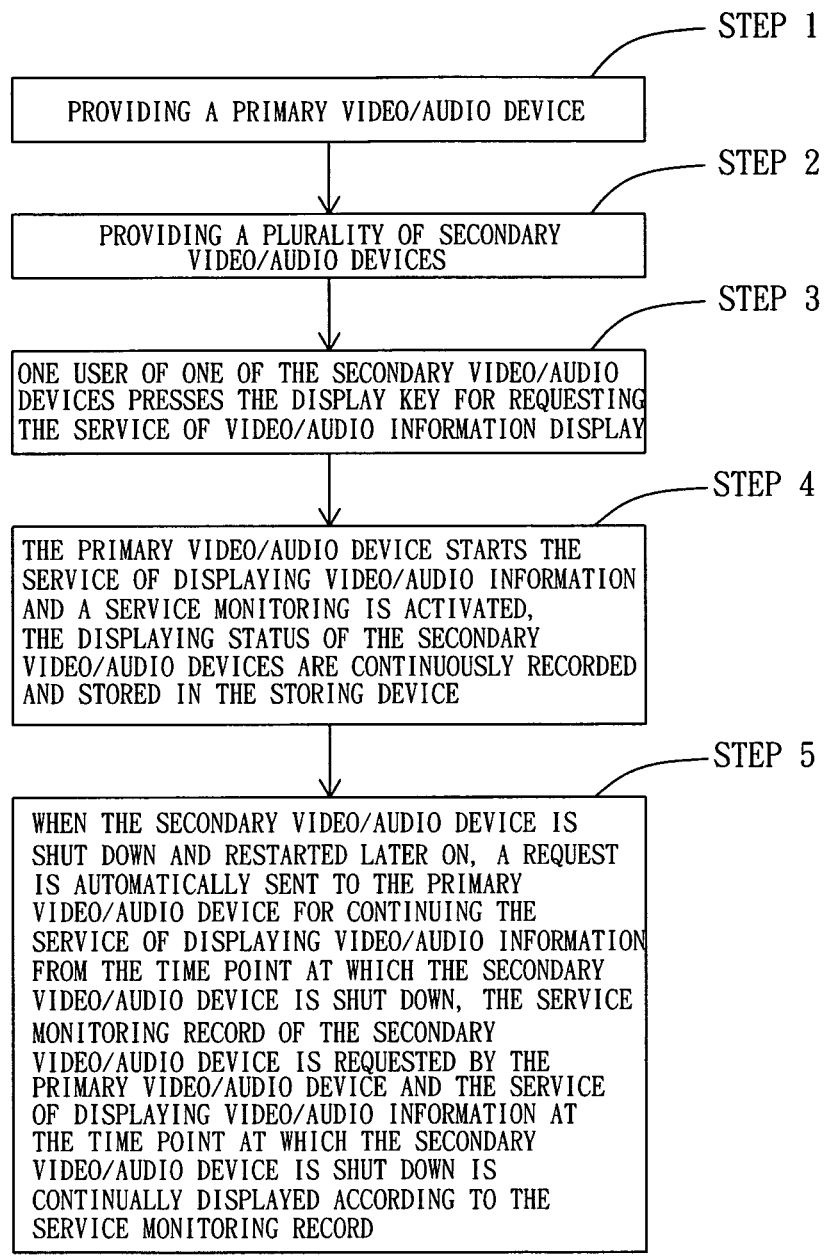
FIG. 10 is a schematic flowchart of the method of recording the status of video/audio system before shutting down provided by the present invention.

Referring to FIG. 10, which is a schematic flowchart of the method of recording the status of video/audio system before shutting down provided by the present invention. As shown in FIG. 10, the method of recording the status of video/audio system before shutting down provided by the present invention comprises the steps of: providing a primary video/audio device 10 (step 1); providing a plurality of secondary video/audio devices 30 (step 2); the display key 3332 is pressed by a user, a request is sent to the primary video/audio device 10 for the service of displaying video/audio information; the primary video/audio device 10 starts the service of displaying video/audio information and a service monitoring is activated, the displaying status of the secondary video/audio devices 30 are continuously recorded and stored in the storing device 11 (step 3); when the secondary video/audio device 30 is shut down and restarted later on, a request is automatically sent to the primary video/audio device 10 for continuing the service of displaying video/audio information from the time point at which the secondary video/audio device 30 is shut down, the service monitoring record of the secondary video/audio device 30 is requested by the primary video/audio device 10 and the service of displaying video/audio information at the time point at which of the secondary video/audio device 30 is shut down is continually displayed according to the service monitoring record (step 4).

In the step 1, a primary video/audio device 10 is provided, and the primary video/audio device 10 is further provided with a micro processor 19, a storing device 11 and a network interface 12, the primary video/audio device 10 can provide at least one service of displaying video/audio information; wherein the network interface 12 can be a wired or a wireless network; when the network interface 12 is a wireless network, the network interface 12 can be a Bluetooth, an 802.11x, a WLAN, a WiMax, a Zigbee or a similar art; when the network interface 12 is a wired network, the network interface 12 can be a RJ-11, a RJ-45/PoE, a Power Line (HomePlug AV), a USB cable, a 1394 cable, a MOST, a IDB-1394 or a similar art. The primary video/audio device 10 is further provided with a housing 15, a printed circuit board 16, a storing device 11 and a micro processor 19, as described above.

In the step 2, a plurality of secondary video/audio devices 30 are provided, each of the secondary video/audio devices 30 is provided with a digital video/audio decoding device 34, a network interface 31, a display panel 32 or a video/audio output interface 35 connected to an external LCD monitor 36 and an operation interface 33 provided with a display key 3332; wherein the network interface 31 can be a wired or wireless network that has the same network protocol as the network interface 12; the display panel 32 or the video/audio output interface 35 connected to the external LCD monitor 36 can be, but not limited to, a LCD or a flat monitor that can be installed at the central controlling display or a rear end of a seat of a vehicle for the convenience in viewing; the operation interface 33 can be a remote control, a touch screen device or a key.

In the step 3, when the service of video/audio displaying is started, the primary video/audio device 10 activates a service monitoring, and the displaying status of all the secondary video/audio devices 30 are continually recorded and stored in the storing device 11; wherein the storing device 11 is a permanent storing device, e.g. but not limited to the storing device 11 mentioned above.

In the step 4, when the secondary video/audio device 30 is shut down and restarted later on, a request is automatically sent to the primary video/audio device 10 for continuing the service of displaying video/audio information from the time point at which the secondary video/audio device 30 is shut down, the service monitoring record of the secondary video/audio device 30 is requested by the primary video/audio device 10 and the service of displaying video/audio information at the time point at which the secondary video/audio device 30 is shut down is continually displayed according to the service monitoring record.

With the method of recording the status of video/audio system before shutting down provided by the present invention, when the secondary video/audio device 30 is shut down and restarted later on, the display panel 32 thereof would display the image shown before shutting down and continues to display.

As mentioned above, the system of sharing video/audio and the method of the same provided by the present invention, a wired or a wireless network interface is used for transferring digital video/audio files from the primary video/audio device to each of the secondary video/audio devices, the user of each secondary video/audio device can share the media content that he is currently watching with other users according to his willingness; the method of sharing navigating information provided by the present invention let the driver share the navigating information with other users, the other users can also search and plan the navigating information and then share the result with the driver so the driving safety is increased.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A system of individually and separately displaying and sharing video/audio in a vehicle comprising:
   a primary video/audio device located in the vehicle and having a housing, a micro processor, a storing device and a network interface, the micro processor, the storing device and the network interface are located in the housing, the primary video/audio device provides at least one service of displaying digital video/audio information; and a plurality of secondary video/audio devices located in the vehicle, each of the secondary video/audio devices is provided with a digital video/audio decoding device, a network interface, a display unit and an operation interface, the display unit is selected from a group consisting of a display panel and a video/audio output interface, the video/audio output interface is connected to an external monitor, and each of the secondary video/audio devices is connected to the primary video/audio device via the network interface, and the operation interface having a display key and a share key;

wherein, when the display key is pressed on a first secondary video/audio device of the secondary video/audio devices, digital video/audio information is transferred to the first secondary video/audio device by the primary video/audio device, and the digital video/audio decoding device receiving and decoding the digital video/audio information, and generating video and audio, the video and audio being displayed on the display panel or the video/audio output interface connected to the external monitor of the first secondary video/audio device;

wherein, when a corresponding display key is pressed on other secondary video/audio devices of the plurality of secondary video/audio devices, corresponding digital video/audio information is transferred to the corresponding secondary video/audio device by the primary video/audio device, and a corresponding digital video/audio decoding device receiving and decoding the corresponding digital video/audio information, and generating corresponding video and audio, the corresponding video and audio being displayed on the display panel or the video/audio output interface connected to the external monitor of the corresponding one of the other secondary video/audio devices and is either a same video and audio or a different video and audio as being displayed on other ones of the plurality of secondary video/audio devices.

2. The system of individually and separately displaying and sharing video/audio in the vehicle according to claim 1, wherein the share key selectively sending and displaying a "share" prompt on the display unit of other secondary video/audio devices of the plurality of secondary video/audio devices for a preset amount of time;

wherein, when the share key is pressed on a first secondary video/audio device of the plurality of secondary video/audio devices, the "share" prompt is displayed on the display units of other secondary video/audio devices for the preset amount of time, and when rejecting ones of the other secondary video/audio devices reject the "share" prompt, the "share" prompt will disappear from the display after the preset amount of time, and, when accepting ones of the other secondary video/audio devices press the share key within the preset amount of time accepting the "share" prompt from the first secondary video/audio device and when the "share" prompt is accepted by the primary video/audio device, video/audio information being obtained from the at least one service of displaying digital video/audio information of the primary video/audio device and displayed on the display unit of the first secondary video/audio device is transferred via the primary video/audio device to the accepting ones of the other secondary video/audio devices and synchronously displayed on the display unit of the accepting ones of the other secondary video/audio devices;

each of the secondary video/audio devices individually and at-any-time applies a service request to the primary video/audio device and obtains a related service selected from a group consisting of video/audio displaying, and the first secondary video/audio device of the secondary video/audio devices invites the other secondary video/audio devices to share video/audio information that is being displayed on the display panel of the first secondary video/audio device by pressing the share key of the accepting ones of the other secondary video/audio devices;

wherein the primary video/audio device providing the video/audio information to the first secondary video/audio device and the accepting ones of the other secondary video/audio devices and the video/audio information being displayed on the display unit of the first secondary video/audio device is synchronously displayed on the display unit of each of the accepting ones of the other secondary video/audio devices.

3. The system of individually and separately displaying and sharing video/audio in the vehicle according to claim 1, wherein the housing of the primary video/audio device having a top housing member and a bottom housing member, an accommodating space is formed between the top housing member and the bottom housing member and the front end of the top housing member has an opening;

a printed circuit board located in the accommodating space of the housing of the primary video/audio device;

a storing device inserted into the accommodating space via the opening for storing at least one digital video/audio file; and a micro processor located on the printed circuit board and coupled with the storing device for controlling the operation of the primary video/audio device;

wherein the printed circuit board is located in the accommodating space of the housing between the micro processor and the storing device.

4. The system of individually and separately displaying and sharing video/audio in the vehicle according to claim 3, wherein two opposing sides of the top housing member are respectively provided with a heat sinking fin for facilitating the heat sinking of the housing, the bottom end of the bottom housing member is further provided with an insert slot, a withdraw button and a connecting sheet, wherein the insert slot and the withdraw button are exposed outside of the opening, the insert slot is served to receive the storing device, the withdraw button is served to withdraw the storing device, the connecting sheet is disposed at the rear end of the insert slot and is retained on the bottom housing member, a connecting device is provided on top of the connecting sheet for connecting to the storing device;

wherein the connecting sheet, the connecting device and the storing device are located between the printed circuit board and the bottom housing member and the micro processor is located between the printed circuit board and the top housing member.

5. The system of individually and separately displaying and sharing video/audio in the vehicle according to claim 1, wherein the storing device is selected from a group consisting of a dynamical pulling hard disc and a silicon disc.

6. The system of individually and separately displaying and sharing video/audio in the vehicle according to claim 1, wherein the operation interface is a remote control having the display key and the share key located thereon.

7. The system of individually and separately displaying and sharing video/audio in the vehicle according to claim 1, wherein the network interface of the primary video/audio device and the network interfaces of the secondary video/ audio devices are both selected from a group consisting of a wired network and a wireless network.

8. The system of individually and separately displaying and sharing video/audio in the vehicle according to claim 7, wherein the interface of the wireless network is selected from a group consisting of a Bluetooth, a 802.11x, a WLAN, a Wimax, and a Zigbee; the interface of the wired network is selected from a group consisting of a RJ-11, a RJ-45/PoE, a Power Line (HomePlug AV), a USB cable, a 1394 cable, a MOST, and a IDB-1394.

9. The system of individually and separately displaying and sharing video/audio in the vehicle according to claim 1, wherein the display panel is selected from a group consisting of a LCD or a flat monitor, and the video/audio output interface is selected from a group consisting of an AV terminal, a S terminal, a HDMI terminal, a VGA terminal, and a RGB terminal.

10. The system of individually and separately displaying and sharing video/audio in the vehicle according to claim 1, wherein the service of displaying and sharing further includes: a music display service, a radio display service, a game service, a navigation service, a digital TV display service and an image display service.

11. The system of individually and separately displaying and sharing video/audio in the vehicle according to claim 1, wherein the display unit of each of the secondary video/audio devices displays a selecting menu consisting of a navigating map, a digital TV, a video, an image, a music, a game and a radio, and a user selects a desired service via the operation interface, and the selected service is shared with the other users of the other secondary video/audio devices via the share key disposed on the operation interface.

12. The system of individually and separately displaying and sharing video/audio in the vehicle according to claim 1, wherein the digital video/audio decoding device is selected from a group consisting of a high speed micro processor using software to decode digital video/audio and a micro processor having a decoding chip equipped with a certain video/audio decoding circuit.

13. The system of individually and separately displaying and sharing video/audio in the vehicle according to claim 3, wherein the format of the digital video/audio file is selected from a group consisting of JPEG, MPEG, H.264, WMV, MP3, WMA, and map information.

14. The system of individually and separately displaying and sharing video/audio in the vehicle according to claim 1, wherein when the display key of the first secondary video/audio device is pressed, the primary video/audio device transfers the digital video/audio information requested by the first secondary video/audio device to the secondary video/audio device; and each of the secondary video/audio devices has an individual digital video/audio decoding device for decoding the video/audio information sent by the primary video/audio device then the decoded video/audio information is displayed on the display panel or the video/audio output interface, so an object of individually and separately displaying video/audio information is achieved.

15. The system of individually and separately displaying and sharing video/audio in the vehicle according to claim 1, wherein the operation interface is a touch screen device having the display key and the share key located thereon.

16. The system of individually and separately displaying and sharing video/audio in the vehicle according to claim 1, wherein the operation interface is a key having the display key and the share key located thereon.

17. A method of individually and separately displaying video/audio information in a vehicle comprising the steps of:
 a. providing the primary video/audio device as claimed in claim 1;
 b. providing the plurality of secondary video/audio devices as claimed in claim 1; and
 c. when a user of a first secondary video/audio device of the secondary video/audio devices pressing the display key, transferring digital video/audio information to the secondary video/audio device by the primary video/audio device, and the digital video/audio decoding device receiving and decoding the digital video/audio information, and generating video and audio, the video and audio being displayed on a display panel or an video/audio output interface connected to an external monitor;
 wherein other secondary video/audio devices of the plurality of secondary video/audio devices utilizing step a) through step c) and corresponding video and audio being displayed on a corresponding display panel or a corresponding video/audio output interface connected to a corresponding external monitor of each of the other secondary video/audio devices is either a same video and audio or a different video and audio as being displayed on other ones of the plurality of secondary video/audio devices.

18. The method of individually and separately displaying video/audio information in the vehicle according to claim 17, further comprising the steps of:
 a. pressing the share key on the first secondary video/audio device of the secondary video/audio devices for sharing the video/audio information display;
 b. showing a "share" prompt respectively on the display panels of the other secondary video/audio devices;
 c. when the users of the other secondary video/audio devices reject the "share" prompt, the "share" prompt disappearing after a certain time; and
 d. when the users of the other secondary video/audio devices accept the "share" prompt, the users press the share key on the accepting ones of the other secondary video/audio devices, and, when the "share" prompt is accepted by the primary video/audio device, the video/audio information displayed by the first secondary video/audio device is then transferred via the primary video/audio device to the accepting ones of the secondary video/audio devices by the primary video/audio device, the display panels of the accepting ones of the secondary video/audio devices synchronously display the same video/audio information as shown on the display panel of the first secondary video/audio device that offered the "share" prompt.

* * * * *